(12) United States Patent
Wehlen et al.

(10) Patent No.: US 11,885,396 B2
(45) Date of Patent: Jan. 30, 2024

(54) TRANSMISSION ARRANGEMENT AND DRIVE DEVICE FOR AN ELECTRICALLY DRIVEN VEHICLE

(71) Applicant: ZF Friedrichshafen AG, Friedrichshafen (DE)

(72) Inventors: Timo Wehlen, Friedrichshafen (DE); Stephan Scharr, Friedrichshafen (DE); Eckhardt Lübke, Friedrichshafen (DE); Manfred Till, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/554,458

(22) Filed: Dec. 17, 2021

(65) Prior Publication Data
US 2022/0196121 A1  Jun. 23, 2022

(30) Foreign Application Priority Data
Dec. 18, 2020 (DE) ..................... 10 2020 216 249.2

(51) Int. Cl.
*F16H 3/72* (2006.01)
*F16H 3/70* (2006.01)
*B60K 17/12* (2006.01)

(52) U.S. Cl.
CPC ............. *F16H 3/727* (2013.01); *B60K 17/12* (2013.01); *F16H 3/70* (2013.01);
(Continued)

(58) Field of Classification Search
CPC ..... F16H 3/727; F16H 2003/008; B60K 1/02; B60K 2007/0061; B60K 17/12; B60K 17/16; B60K 2025/005
See application file for complete search history.

(56) References Cited

U.S. PATENT DOCUMENTS 5,558,589 A   9/1996  Schmidt
7,034,481 B2  4/2006  Imai
(Continued)

FOREIGN PATENT DOCUMENTS

DE       69611745 T2   7/2001
DE    102004028102 A1  2/2005
(Continued)

OTHER PUBLICATIONS

German Search Report DE 10 2020 216 249.2, dated Oct. 4, 2021. (16 pages).

*Primary Examiner* — Huan Le
(74) *Attorney, Agent, or Firm* — Dority & Manning, P.A.

(57) ABSTRACT

A transmission arrangement for an at least partially electrically driven vehicle includes a first electric machine defining a first central longitudinal axis and having a first gear stage and a second gear stage. The arrangement further includes a second electric machine defining a second longitudinal axis and having a first gear stage and a second gear stage. Further, the arrangement includes a transmission housing, with the first and second electric machines being arranged in the transmission housing. Additionally, the arrangement includes a differential drivingly connected to the second gear stages of the first and second electric machines. The first and second central longitudinal axes are axially parallel to each other on a circular path, the circular path being perpendicular to an output axis.

16 Claims, 4 Drawing Sheets

(52) U.S. Cl.
CPC ............... *F16H 2200/0013* (2013.01); *F16H 2200/0021* (2013.01); *F16H 2200/2007* (2013.01); *F16H 2200/2033* (2013.01)

(56) References Cited

U.S. PATENT DOCUMENTS

| | | |
|---|---|---|
| 10,269,250 B2 | 4/2019 | Altinger et al. |
| 10,300,910 B2 * | 5/2019 | Jeong .............. B60W 30/18145 |
| 2021/0237566 A1 | 8/2021 | Chopra et al. |

FOREIGN PATENT DOCUMENTS

| | | | |
|---|---|---|---|
| DE | 102011088647 A1 * | 6/2013 | ............. B60K 6/387 |
| DE | 102011088647 A1 | 6/2013 | |
| DE | 102015002405 A1 | 8/2016 | |
| DE | 102017214745 A1 | 2/2019 | |
| DE | 112019004130 T5 | 5/2021 | |
| WO | WO 2016/134827 | 9/2016 | |

* cited by examiner

TRANSMISSION ARRANGEMENT AND DRIVE DEVICE FOR AN ELECTRICALLY DRIVEN VEHICLE

CROSS-REFERENCE TO RELATED APPLICATION

The present application is related and has right of priority to German Patent Application No. 10 2020 216 249.2 filed on Dec. 18, 2020, the entirety of which is incorporated by reference for all purposes.

FIELD OF THE INVENTION

The invention relates generally to a transmission arrangement for an at least partially electrically driven vehicle. The invention further relates to a drive device for a vehicle of this type and to an at least partially electrically driven vehicle having a drive device or a transmission arrangement.

BACKGROUND

DE 10 2015 002 405 A1 describes a vehicle having at least two electric motors and a control device, wherein the electric motors drive at least one shaft. The control device distributes a power to be provided at the at least one shaft onto the at least two electric motors as a function of the power to be provided. The particular electric motor is connected, for example, to a transmission, wherein the electric motors and the transmission are combined to form a drive train.

SUMMARY OF THE INVENTION

The present invention provides a transmission arrangement and a drive device for an at least partially electrically driven vehicle where the power density of the transmission arrangement is improved while installation space is saved.

A transmission arrangement according to the invention for an at least partially electrically driven vehicle includes at least one first electric machine having a first central longitudinal axis and a second electric machine having a second longitudinal axis, wherein the at least two electric machines are arranged in a shared transmission housing, wherein at least the first and the second central longitudinal axes are axially parallel on a common circular path aligned essentially perpendicularly to an output axis. Each electric machine has at least one first gear stage and one second gear stage, and wherein the second gear stages are drivingly connected to a differential. Therefore, the circular path is arranged either coaxially or in parallel to the output axis, wherein the circular path is situated on a plane that is aligned essentially perpendicularly to the output axis.

At least one, preferably two output shaft(s) operatively connected to the differential and coaxial to the output axis is/are arranged on the output axis of the transmission arrangement and, in turn, are at least indirectly drivingly connected to a particular wheel of the vehicle. The output axis is preferably centrally arranged in the transmission housing and/or in the installation space of the transmission housing, and so the various components of the transmission arrangement and, in fact, particularly the at least two electric machines, are arranged around the output axis.

The circular path, on which the central longitudinal axes are arranged, is an circle having a constant radius and diameter, so the central longitudinal axes of the electric machines are arranged in parallel to one another in the transmission housing at the same distance from the output axis, wherein each central longitudinal axis is arranged in a particular sector or circular segment of the circular path. The higher the number of central longitudinal axes or components arranged on the circular path is, the higher is the number of circular segments and/or the smaller are the angular ranges and/or the partial angles of the circular segments, on which the particular component and the particular central longitudinal axis are arranged. In other words, each electric machine is arranged on a circular segment of the circular path, wherein the angular range of the particular circular segment is, for example, 180° when the components are uniformly distributed in the transmission housing and there are only two electric machines. When there are three electric machines, the angular range is, for example, 120°, and when there are four electric machines, the angular range is, for example, 90°.

The central longitudinal axes of the electric machines preferably extend through the center of the installation space needed and utilized by the particular electric machine. This installation space varies depending on the type and design of the particular electric machine, and so the transmission arrangement, in particular the gear stages, is/are designed such that the central longitudinal axes are situated on the circular path and perpendicularly intersect the circular path. Consequently, the plane of the circular path is arranged perpendicularly to the output axis, wherein the first and the second central longitudinal axes are aligned in parallel to the output axis.

Preferably, the first central longitudinal axis is arranged coaxially to a first rotor shaft of the first electric machine and the second longitudinal axis is arranged coaxially to a second rotor shaft of the second electric machine. Each electric machine consists of at least one fixed stator and one rotor, which is rotatable in relation to the stator and is at least indirectly connected to the particular rotor shaft. The rotor shaft is the input shaft or is rotationally fixed to an input shaft that transmits a torque and a rotational speed onto the particular first gear stage. The input shaft is a transmission input shaft of the particular first gear stage. Consequently, the rotor shaft of the particular electric machine is situated on the circular path and perpendicularly intersects the circular path.

Due to the arrangement of several electric machines in a shared main housing, the electric machines are comparatively small, i.e., having a small diameter, and so, consequently, a higher machine rotational speed or rotor circumferential speed of the particular electric machine is implementable. Additionally, the greater the number of electric machines in the transmission arrangement is, the better a torque loss is as the comparatively smaller machine diameter is compensated for. Due to the differential, a drive-power summation of all drive powers of the electric machines takes place, so all electric machines act upon the output individually or jointly.

The electric machines are preferably arranged on the same side of the transmission. As a result, an identical direction of rotation of the rotor shafts and a dual use of transmission parts is achieved. The electric machines are identical, i.e., having the same size, power, and/or type. Alternatively, it is conceivable that the electric machines have different powers, necessary installation space volumes, and/or types depending on the requirement on the transmission arrangement.

The transmission housing is preferably essentially in the shape of a cylinder, wherein the longitudinal axis of the transmission housing and/or of the installation space needed by the transmission housing are/is preferably arranged coaxially to the output axis. Alternatively, the transmission housing is essentially in the shape of a box, wherein the longitudinal axis of the box-shaped transmission housing and/or of the installation space needed by the transmission housing are/is also arranged coaxially to the output axis.

The differential is arranged in the power flow downstream from the gear stages coaxially to the output axis or on the output axis and preferably connects two output shafts to one another, each of which is operatively connected to at least one particular wheel of the vehicle. The differential is acted upon by a torque as well as a rotational speed by the last gear stage of the first electric machine as well as by the last gear stage of the second electric machine, wherein, as a result, a power summation takes place at the differential.

The first gear stage of the first electric machine has a first ratio, wherein the first gear stage of the second electric machine has a second ratio. The two ratios of the first gear stages are identical or different depending on the requirement of the transmission arrangement. In addition, the second gear stage of the first electric machine has a first ratio, wherein the second gear stage of the second electric machine has a second ratio. Similar to the first gear stage, the two ratios of the second gear stages are identical or different depending on the requirement of the transmission arrangement. A variation of the transmission ratios of the first gear stage and/or the second gear stage of the first electric machine and/or the second electric machine has the advantage that the drive is more efficient and, furthermore, the transmission arrangement is designed with regard to acoustic aspects.

Preferably, the particular first gear stage is a planetary transmission having at least one planetary gear set. Accordingly, the planetary transmission includes a sun gear and a ring gear, wherein at least one planetary gear set having a plurality of planet gears rotatably mounted at the planet carrier is spatially arranged between the sun gear and the ring gear. According to one exemplary embodiment, the rotor shaft of the particular electric machine is rotationally fixed to the sun gear, wherein the ring gear is fixedly arranged. The planet carrier is rotationally fixed to an intermediate shaft, which is operatively connected to the second gear stage of the particular electric machine in order to transmit a torque and a rotational speed to the particular second gear stage. In this case, the particular planetary transmission is a minus planetary gear set. Alternatively, it is conceivable that the planetary transmission is instead a plus planetary gear set, a stepped planetary gear set, or as another form of a planetary gear set.

The second gear stage of the particular electric machine is operatively connected to the differential, and so the second gear stage is jointly utilized for summing the drive power and/or jointly interacts with the downstream differential. If the transmission arrangement includes three or more gear stages, the last gear stages of the particular electric machine always jointly interact with the differential. For example, in one embodiment, three gear stages are provided between the first electric machine and the differential and four gear stages are provided between the second electric machine and the differential, wherein, in this example, the third gear stage of the first electric machine and the fourth gear stage of the second electric machine are jointly utilized for power summation and/or are jointly operatively connected directly to the differential.

Due to the summation of drive power taking place, the electric machines are comparatively compact, in particular having a comparatively small diameter. Moreover, the power-to-weight ratio of the transmission arrangement is increased and, simultaneously, the necessary installation space of the transmission arrangement is reduced due to the transmission components arranged around the output axis, and so, conversely, larger batteries are utilized for the electrical supply of the transmission arrangement, which increase the range of the at least partially electrically driven vehicle. Instead of a larger battery volume, the installation space that is saved is then utilized for enlarging the interior space of the vehicle, in particular of the trunk of the vehicle.

The transmission arrangement is arranged in parallel or transversely to the vehicle longitudinal axis, wherein, in particular, a transverse installation of the transmission arrangement and/or a transverse installation of the electric machines in the vehicle, in contrast to an in-line arrangement of electric machines which are lined up along an output axis, are/is advantageous due to the small amount of necessary installation space. In the case of a longitudinal arrangement of the transmission arrangement, i.e., in parallel to the vehicle longitudinal axis, the output shafts connected to the differential are arranged transversely or perpendicularly to the output axis. In the case of a transverse arrangement of the transmission arrangement, i.e., transversely to the vehicle longitudinal axis, the output shafts connected to the differential are arranged in parallel, preferably coaxially, to the output axis.

In one embodiment, the transmission arrangement also includes at least one power electronics unit having a third central longitudinal axis, wherein the third central longitudinal axis is also arranged on the common circular path. In other words, the transmission arrangement according to one exemplary embodiment includes at least two electric machines and at least one power electronics unit, each having central longitudinal axes, which are situated on the circular path, and so the electric machines and the particular power electronics unit are arranged around the output axis in the shared transmission housing. Preferably, the central longitudinal axes are arranged on the circular path, uniformly distributed around the output axis, and so an angular subdivision on the circular path of 120° results in the case of a uniform distribution of two electric machines and one power electronics unit. Consequently, the three longitudinal axes are arranged on the circular path offset by 120° and the longitudinal axes intersect the circular path spaced apart from one another by 120°.

Moreover, it is conceivable that the power electronics unit extends over two circular segments. This is advantageous for the case in which the power electronics unit is arranged, for example, above the electric machines in the direction of gravity, wherein the power electronics unit is flat, in order to save vertical installation space. Due to the fact that the two electric machines are arranged underneath the power electronics unit in the direction of gravity, in addition, the center of gravity of the transmission arrangement and, therefore, of the vehicle is shifted vertically downward and, as a result, the driving characteristics of the vehicle are improved.

According to one exemplary embodiment, the transmission arrangement also includes at least one clutch unit, which is configured for decoupling at least one of the two electric machines from the drive output. Depending on the power requirement, the electric machine, which is coupleable via the clutch unit, or the electric machines, which are coupleable via a particular clutch unit, is/are optionally decoupleable from the drive output in order to configure the drive of the vehicle to be appropriately more efficient. In addition, a so-called torque boost function is achieved by coupling one or several previously decoupled electric machine(s) to the drive output. In other words, at least one electric machine is decoupleable from the drive output, whereas at least one electric machine is always drivingly connected to the drive output with a fixed rotational speed. An efficiency of the drive is adaptable and optimizable by decoupling or coupling at least one electric machine from or to the drive output.

Moreover, the particular clutch unit is preferably electromechanically, magnetically, and/or hydraulically engageable. In particular, the particular clutch unit is a multi-disk clutch or a dog clutch and is at least indirectly actuated, i.e., disengaged or engaged, by the particular power electronics unit or a separate control unit. The clutch unit, in a non-actuated condition, is in a disengaged position or in an engaged position. A clutch unit that is in a disengaged position in a non-actuated condition is advantageous in terms of energy. By comparison, a clutch unit that is in an engaged position in a non-actuated condition is advantageous during a faulty mode of operation and, thereby, for safety reasons.

Preferably, the particular clutch unit is arranged in the power flow between the first gear stage and the second gear stage. In other words, a clutch unit is arranged between the first and second gear stages operatively connected to the first electric machine and/or a clutch unit is arranged between the first and second gear stages operatively connected to the second electric machine. An arrangement between two gear stages is advantageous in order to avoid power losses caused by concurrently moved or entrained transmission parts of the drive train. If more than two gear stages are provided, the particular clutch unit is also arrangeable between a second gear stage and a third gear stage or between a third gear stage and a fourth gear stage, etcetera.

Alternatively, or in addition, to the clutch unit, the first gear stage of the first electric machine and/or the first gear stage of the second electric machine are/is a multi-stage unit, which is configured for shifting between at least two gear steps. Moreover, alternatively, or additionally, the second gear stage of the first electric machine and/or the second gear stage of the second electric machine are/is a multi-stage unit, which is configured for shifting between at least two gear steps. The particular multi-stage unit therefore has multiple transmission ratios, wherein the multi-stage unit is configured for shifting between at least a first transmission ratio and a second transmission ratio. The advantage of the multi-stage unit is essentially that of supporting the output torque of the particular electric machine in the load path during a gear change.

According to one further exemplary embodiment, the transmission arrangement preferably includes an oil sump, wherein the oil sump is arranged underneath the electric machines in the direction of gravity. The oil sump is provided, in particular, for providing coolant and/or lubricant, and so a cooling and/or lubrication of the electric machines are/is implemented, which run wet in an oil chamber in this case. Consequently, the electric machines are fluidically connected to the oil sump in order to deliver and carry away a coolant and/or lubricant. In addition, the particular power electronics unit is cooled via the oil sump and an appropriate connection. The oil sump further includes an oil pump and an oil filter. The oil sump has a fourth central longitudinal axis, which is also arranged on the common circular path. In one embodiment, the fourth longitudinal axis extends through the center of gravity or through the center of the necessary installation space of the oil sump. Alternatively, the oil sump is also arrangeable in the transmission arrangement independently of the circular path, although always in the lower third—in the direction of gravity—of the installation space of the transmission arrangement and underneath the electric machines.

A drive device according to the invention for an at least partially electrically driven vehicle includes at least one transmission arrangement according to the above-described type. An at least partially electrically driven vehicle according to the invention includes a drive device of this type or a transmission arrangement according to the above-described type. The vehicle is preferably a motor vehicle, in particular an automobile (for example, a passenger car having a weight of less than 3.5 tons), a bus, or a truck (bus and truck, for example, having a weight of over 3.5 tons).

The definitions presented above, and comments presented regarding technical effects, advantages, and advantageous embodiments of the transmission arrangement according to the invention also apply similarly for the drive device according to the invention and for the at least partially electrically driven vehicle according to the invention.

BRIEF DESCRIPTION OF THE DRAWINGS

Exemplary embodiments of the invention are explained in greater detail in the following with reference to the diagrammatic drawings, wherein identical or similar elements are labeled with the same reference numbers, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
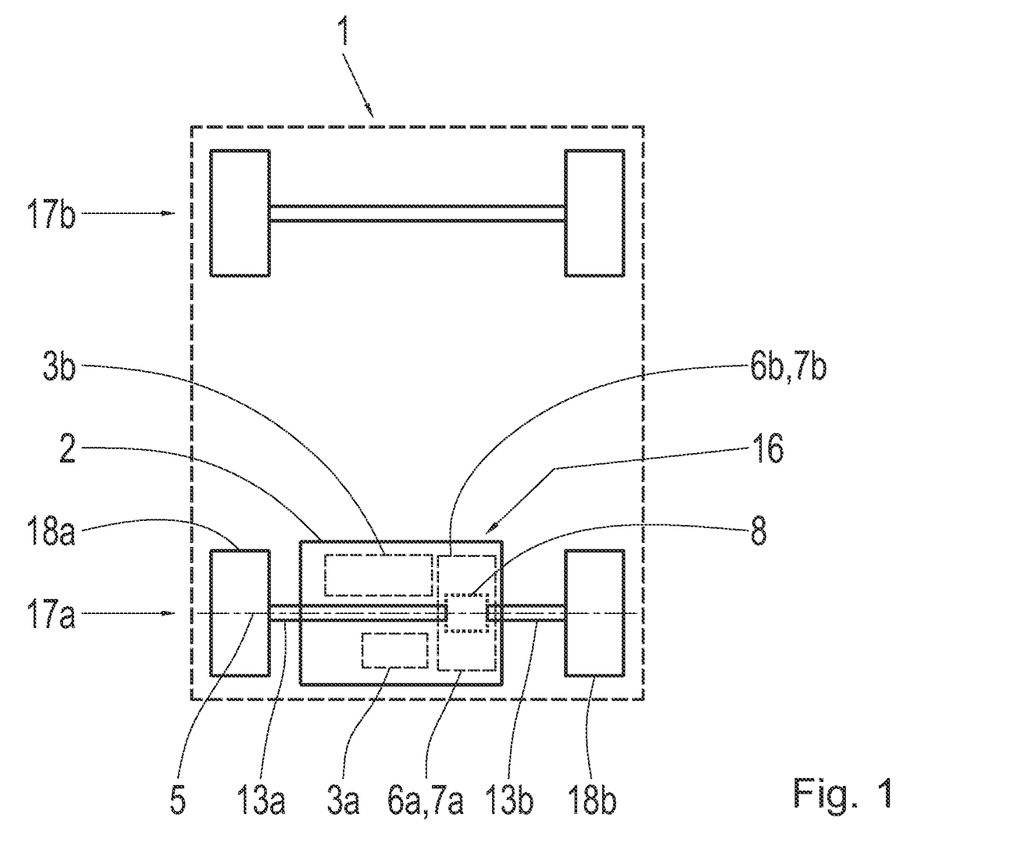
FIG. 1 shows a schematic top view of a vehicle including a first embodiment of a transmission arrangement according to the invention.

FIG. 1 shows an at least partially electrically driven vehicle 1, which includes a drive device having a transmission arrangement 16. According to the present example, the vehicle 1 is an electric vehicle having a first axle 17a and a second axle 17b, wherein the transmission arrangement 16 is drivingly arranged at the first axle 17a.

Figure 2:
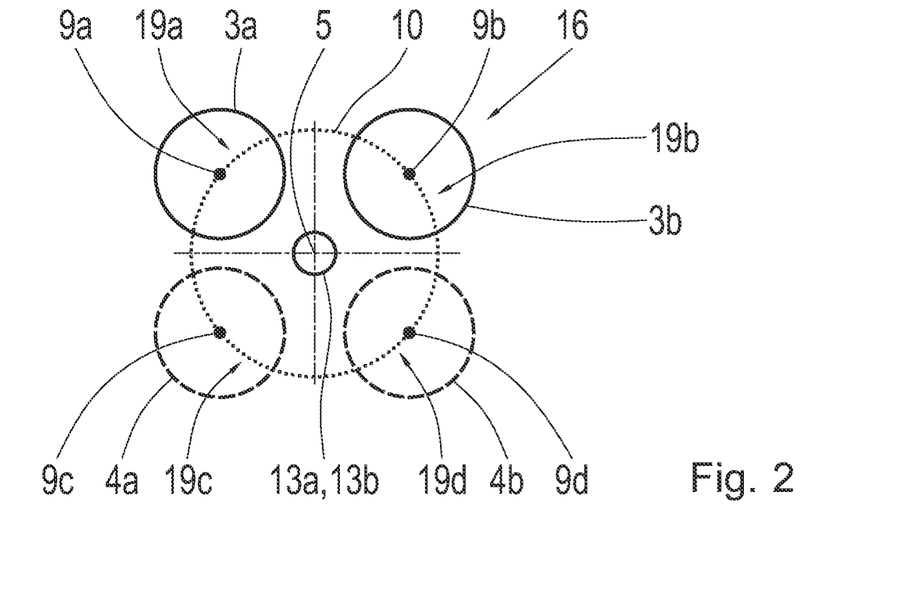
FIG. 2 shows a schematic cross-sectional view of the transmission arrangement shown in FIG. 1 according to the invention.
Figure 3:
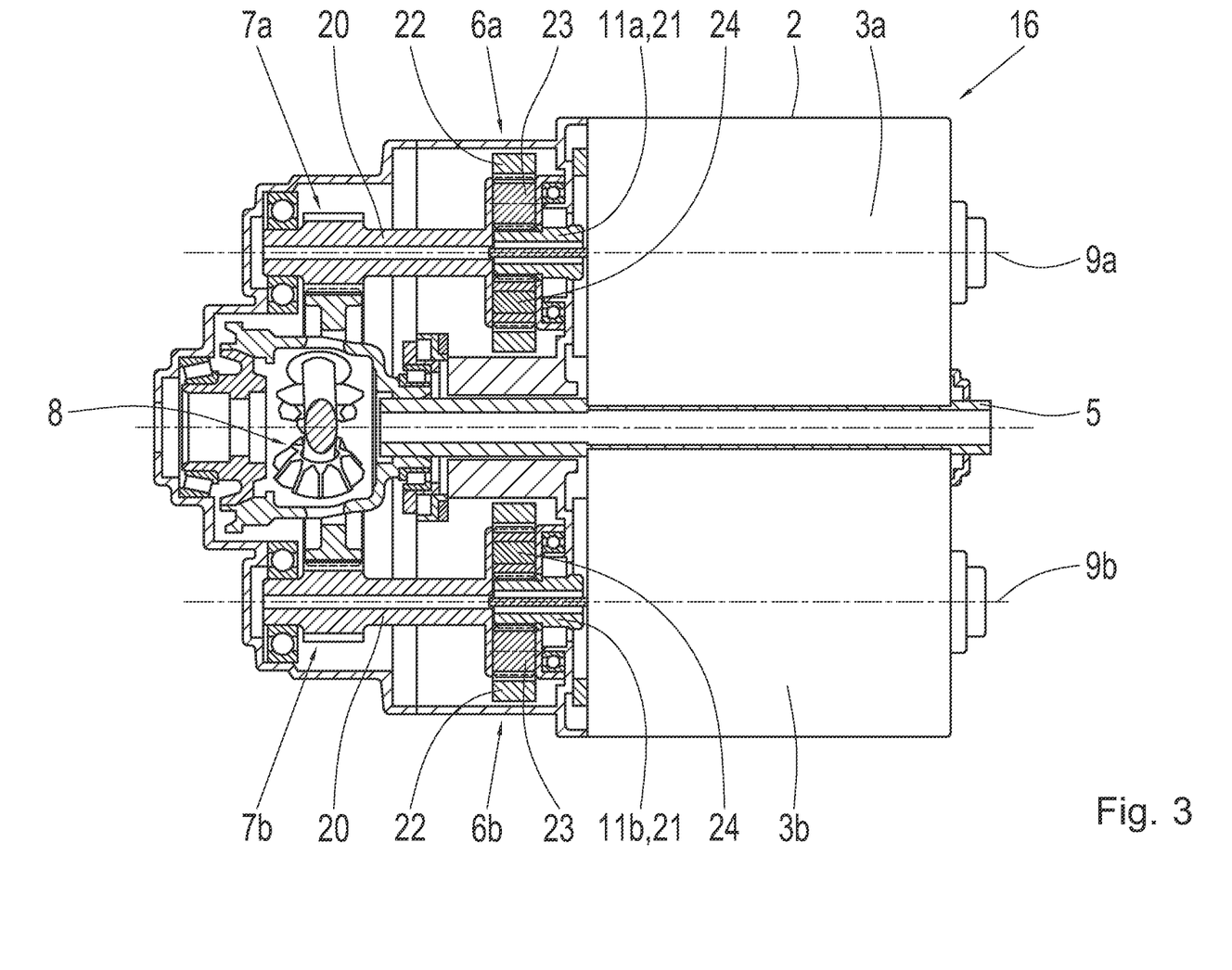
FIG. 3 shows a schematic partial longitudinal cutaway view of the transmission arrangement shown in FIGS. 1 and 2 according to the invention.

The transmission arrangement 16 according to a first exemplary embodiment shown in FIGS. 1-3 includes a first electric machine 3a having a first central longitudinal axis 9a (FIGS. 2 and 3), a second electric machine 3b having a second central longitudinal axis 9b (FIGS. 2 and 3), a first power electronics unit 4a (FIG. 2) having a third central longitudinal axis 9c (FIG. 2), and a second power electronics unit 4b (FIG. 2) having a fourth central longitudinal axis 9d (FIG. 2), wherein the two electric machines 3a, 3b and the power electronics units 4a, 4b are arranged in a shared transmission housing 2. In the present case, the first power electronics unit 4a is connected electrically, and in terms of control, to the first electric machine 3a in a manner not represented in greater detail, wherein the second power electronics unit 4b is connected electrically, and in terms of control, to the second electric machine 3b.

An output axis 5 extends centrally through the installation space of the transmission housing 2 and is arranged coaxially to a first output shaft 13a and a second output shaft 13b, wherein the output shafts 13a, 13b are connected to a differential 8 and to a respective wheel 18a, 18b of the first axle 17a. As is clearly represented in the cross-section of the transmission arrangement 16 in FIG. 2, a circular path 10 is arranged in a plane perpendicular to the output axis 5, wherein the circular path 10 has a constant radius. The circular path 10 has a center (not represented here), which is situated on the output axis 5 in the present case. Consequently, the circular path 10 is arranged coaxially to the output axis 5 in the present case. A parallel arrangement of the circular path 10 in relation to the output axis 5 is also conceivable, and so the center of the circular path 10 is not situated on the output axis 5, but rather spaced apart therefrom. The central longitudinal axes 9a, 9b of the electric machines 3a, 3b and the central longitudinal axes 9c, 9d of the power electronics units 4a, 4b are all arranged on the circular path 10 and intersect the circular path 10 perpendicularly thereto. In other words, the longitudinal axes 9a, 9b, 9c, 9d are parallel to the output axis 5.

According to FIG. 2, the circular path 10 is subdivided into four sectors or circular segments 19a, 19b, 19c, 19d, wherein the first electric machine 3a is arranged in the first circular segment 19a, the second electric machine 3b is arranged in the second circular segment 19b, the first power electronics unit 4a is arranged in the third circular segment 19c, and the second power electronics unit 4b is arranged in the fourth circular segment 19d. The central longitudinal axes 9a, 9b, 9c, 9d are uniformly spaced apart, i.e., arranged on the circular path 10 and offset with respect to one another by an angle of 90°. Depending on the individual integral parts and components of the transmission arrangement 16, any type of division of the circular path 10 into circular segments 19a, 19b, 19c, 19d takes place. The number of components that are arranged in the transmission arrangement 16 and, thereby, the number of central longitudinal axes intersecting the circular path 10, and the number of circular segments varies in any way, wherein the longitudinal axes are always arranged on the circular path 10. For example, instead of two power electronics units 4a, 4b, only one power electronics unit 4a is provided, which is configured for controlling all electric machines 3a, 3b by way of an open-loop system, wherein the free circular segment 19d is replaced by a further component of any type, such as, for example, a further electric machine. In this case, the circular path has only three circular segments 19a, 19b, 19c, wherein a central longitudinal axis 9a, 9b, 9c is arranged on the circular path 10 in each circular segment 19a, 19b, 19c, respectively.

The connection of the electric machines 3a, 3b onto the output shafts 13a, 13b is explained in greater detail in the following with reference to FIG. 3. According to FIG. 3 in combination with FIG. 1, the first electric machine 3a has a first gear stage 6a and a second gear stage 7a, with the first gear stage 6a being a planetary transmission having a planetary gear set, wherein the second electric machine 3b also has a first gear stage 6b and a second gear stage 7b, with the first gear stage 6b being a planetary transmission having a planetary gear set. In the present case, each electric machine 3a, 3b therefore has a first gear stage 6a, 6b and a second gear stage 7a, 7b, wherein more than two gear stages 6a, 7a, 6b, 7b are also conceivable depending on the particular electric machine 3a, 3b. If two gear stages 6a, 7a, 6b, 7b are provided for each electric machine 3a, 3b, as in the present example, the particular second gear stages 7a, 7b are drivingly connected to the differential 8. The differential is arranged in the power flow downstream from the second gear stages 7a, 7b coaxially to the output axis 5 and connects the two output shafts 13a, 13b (FIGS. 1 and 2) to one another. Consequently, the differential 8 is acted upon by a torque as well as a rotational speed by the last gear stage 7a of the first electric machine 3a as well as by the last gear stage 7b of the second electric machine 3b, wherein, as a result, a power summation takes place at the differential 8, which is transmitted onto the output shafts 13a, 13b (FIGS. 1 and 2).

Figure 4:
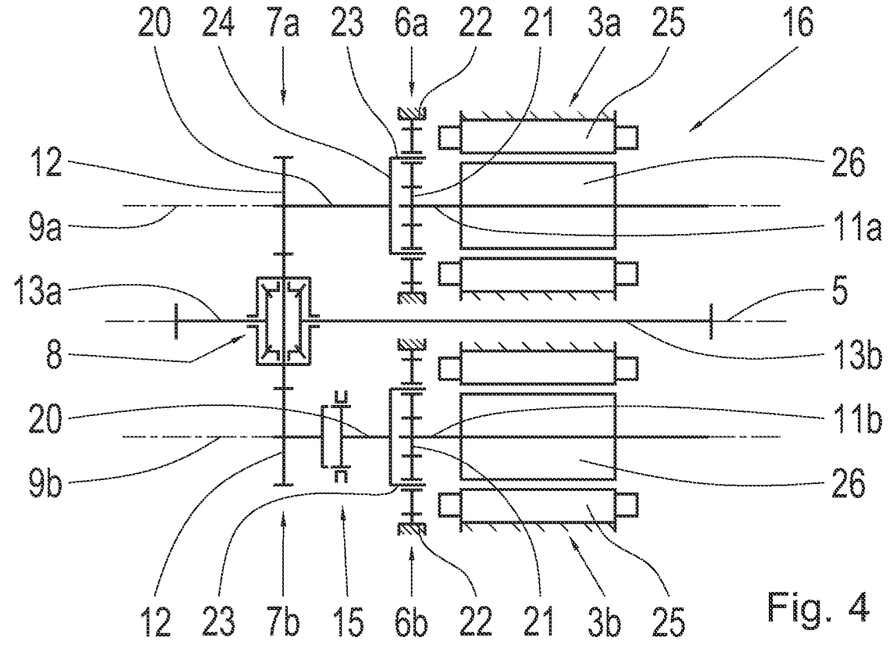
FIG. 4 shows a highly simplified schematic view of a second embodiment of a transmission arrangement according to the invention.
Figure 5:
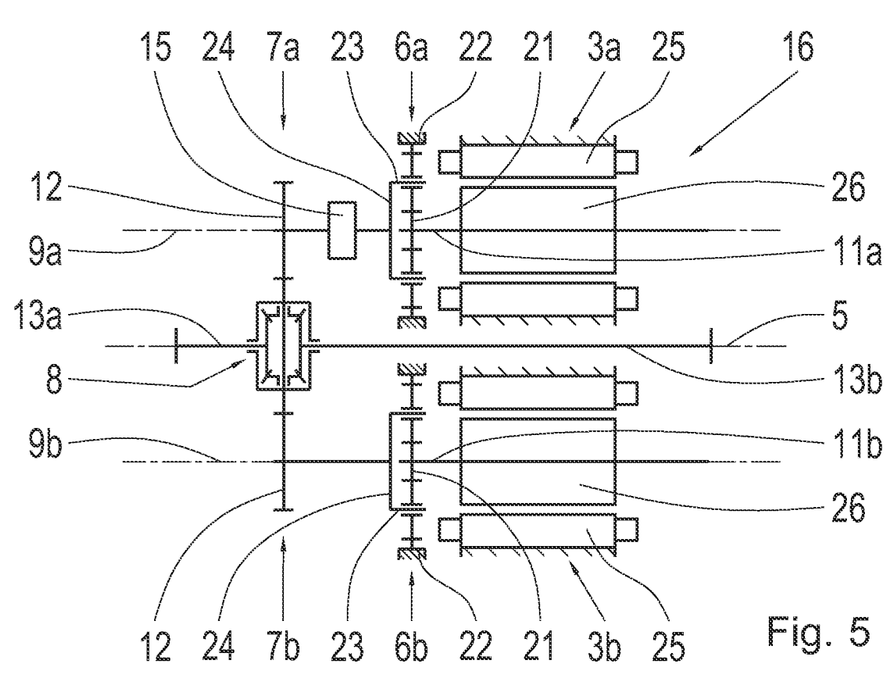
FIG. 5 shows a highly simplified schematic view of a third embodiment of a transmission arrangement according to the invention.

Turning now to FIGS. 4 and 5, both electric machines 3a, 3b include a stator 25 and a rotor 26, wherein the rotor 26 of the particular electric machine 3a, 3b is connected to a respective rotor shaft 11a, 11b, and wherein the first central longitudinal axis 9a is arranged coaxially to the first rotor shaft 11a of the first electric machine 3a and the second longitudinal axis 9b is arranged coaxially to the second rotor shaft 11b of the second electric machine 3b. The rotor shafts 11a, 11b are rotationally fixed to a sun gear 21 of the respective first gear stage 6a, 6b, wherein, via the sun gear 21, a torque and a rotational speed is transmitted via planet gears 23 spatially arranged between the sun gear 21 and a housing-affixed ring gear 22 onto a planet carrier 24 rotationally fixed to a respective intermediate shaft 20, wherein the multiple planet gears 23 are rotatably arranged at the planet carrier 24 and are meshed with the sun gear 21 and the ring gear 22.

Each intermediate shaft 20 is also rotationally fixed to a respective gearwheel 12—represented in FIG. 4 and FIG. 5—of the particular second gear stage 7a, 7b, which transmits the torque and the rotational speed from the first gear stage 6a, 6b into the respective second gear stage 7a, 7b and, thereafter, into the differential 8. In other words, both electric machines 3a, 3b are directly connected to the drive output, i.e., to the output shafts 13a, 13b. The ratios of the gear stages 6a, 6b, 7a, 7b are designed as a function of the electric machines 3a, 3b and the requirements of the transmission arrangement 16. For example, the first gear stage 6a of the first electric machine 3a, the first gear stage 6b of the second electric machine 3b, the second gear stage 7a of the first electric machine 3a, and/or the second gear stage 7b of the second electric machine 3b are part of a multi-stage unit, which is configured for shifting between at least two gear stages. Therefore, with the particular electric machine 3a, 3b, as a function of the particular gear stage 6a, 6b, 7a, 7b as a multi-stage unit, a drive power is transmitted onto the differential 8 and onto the output shafts 13a, 13b, in any way and in a manner appropriate for the operating situation, with a plurality of gear stages and/or transmission ratios. The electric machines 3a, 3b are also identical or different, i.e., having different powers, torques, rotational speeds, types, and/or sizes, depending on the requirements.

The transmission arrangement 16 according to a second exemplary embodiment according to FIG. 4 is essentially identically to the first embodiment according to FIG. 1 through FIG. 3. The essential difference between the two embodiments is that a clutch unit 15 is arranged at the intermediate shaft 20 in the power flow between the first gear stage 6b and the second gear stage 7b of the second electric machine 3b and, in the present case, selectively decouples the second electric machine 3b from the drive output as necessary. As a result, the drive of the vehicle 1 is configured to be more efficient, wherein, in particular, the efficiency of the drive is improved. It is conceivable to also provide a clutch unit 15 in both drive trains, i.e., in the power flow between the first gear stage 6b and the second gear stage 7b of the second electric machine 3b as well as in the power flow between the first gear stage 6a and the second gear stage 7a of the first electric machine 3a, wherein, for the drive, a clutch unit 15 must always be in an engaged condition in order to transmit a drive torque onto the output shafts 13a, 13b and, as a result, drive the vehicle 1.

A third embodiment of the transmission arrangement 16 shown in FIG. 5 is also essentially identically to the first embodiment according to FIGS. 1-3 and to the second embodiment according to FIG. 4, with the difference being essentially that the clutch unit 15 (represented in a highly diagrammatical manner here) is instead arranged at the intermediate shaft 20 in the power flow between the first gear stage 6a and the second gear stage 7a of the first electric machine 3a. In this exemplary embodiment, the clutch unit 15 is configured for decoupling the first electric machine 3a from the drive output as necessary.

Figure 6:
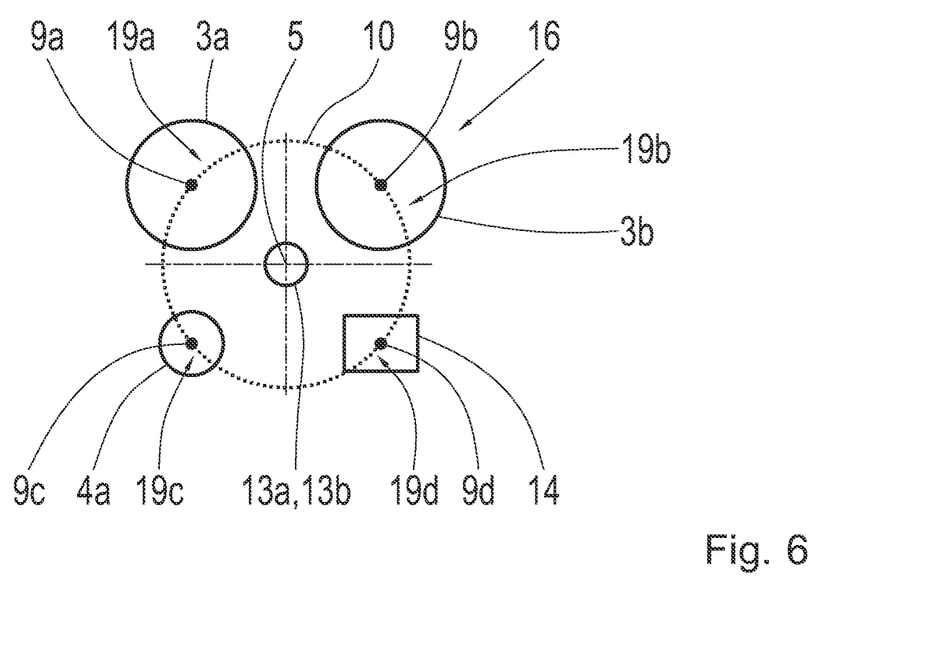
FIG. 6 shows a schematic cross-sectional view of a fourth embodiment of a transmission arrangement according to the invention.

FIG. 6 shows one further alternative embodiment of the transmission arrangement 16, wherein it is shown in cross-section that the transmission arrangement 16 includes two electric machines 3a, 3b, which are arranged, in the direction of gravity, above a single power electronics unit 4a on the one hand and above an oil sump 14 on the other hand. The first electric machine 3a has a first central longitudinal axis 9a, the second electric machine 3b has a second central longitudinal axis 9b, the power electronics unit 4a has a third central longitudinal axis 9c, and the oil sump 14 has a fourth central longitudinal axis 9d, wherein the two electric machines 3a, 3b, the power electronics unit 4a, and the oil sump 14 are jointly arranged in the transmission housing 2. The oil sump 14 is arranged, in the direction of gravity, vertically below or underneath the electric machines 3a, 3b and approximately in the lower third of the transmission arrangement 16. In the present case, the power electronics unit 4a is connected electrically, and in terms of control, to the two electric machines 3a, 3b and to the oil sump 14.

The oil sump 14 is fluidically connected, which is not shown in greater detail here, to the electric machines 3a, 3b and to the power electronics unit 4a and provides a coolant and/or lubricant for cooling and/or lubricating the electric machines 3a, 3b and for cooling the power electronics unit 4a and appropriately delivers the coolant and/or lubricant to the electric machines 3a, 3b and/or to the power electronics unit 4a. An oil pump (not represented) having an oil filter is arranged in the oil sump 14, wherein the oil pump is controlled by the power electronics unit 4a by way of an open-loop system and, if necessary, by way of a closed-loop system in the present case.

According to FIG. 6, the circular path 10 is similarly subdivided into four sectors or circular segments 19a, 19b, 19c, 19d, wherein the first electric machine 3a is arranged in the first circular segment 19a, the second electric machine 3b is arranged in the second circular segment 19b, the power electronics unit 4a is arranged in the third circular segment 19c, and the oil sump 14 is arranged in the fourth circular segment 19d. The central longitudinal axes 9a, 9b, 9c, 9d are spaced apart from one another as a function of the necessary installation space of the components 3a, 3b, 4a, 14, although always on the circular path 10.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 transmission housing
3a first electric machine
3b second electric machine
4a first power electronics unit
4b second power electronics unit
5 output axis
6a first gear stage of the first electric machine
6b first gear stage of the second electric machine
7a second gear stage of the first electric machine
7b second gear stage of the second electric machine
8 differential
9a first central longitudinal axis
9b second central longitudinal axis
9c third central longitudinal axis
9d fourth central longitudinal axis
10 arrangement circle
11a first rotor shaft of the first electric machine
11b second rotor shaft of the second electric machine
12 gearwheel
13a first output shaft
13b second output shaft
14 oil sump
15 clutch unit
16 transmission arrangement
17a first axle
17b second axle
18a first wheel
18b second wheel
19a first circular segment
19b second circular segment
19c third circular segment
19d fourth circular segment
20 intermediate shaft
21 sun gear
22 ring gear
23 planet gear
24 planet carrier
25 stator
26 rotor

The invention claimed is:

1. A transmission arrangement (16) for an at least partially electrically driven vehicle (1), comprising:
  a first electric machine (3a) defining a first central longitudinal axis (9a) and having a first gear stage (6a) and a second gear stage (7a);

a second electric machine (3b) defining a second longitudinal axis (9b) and having a first gear stage (6b) and a second gear stage (7b);

a transmission housing (2), the first and second electric machines (3a, 3b) being arranged in the transmission housing (2);

a differential (8) drivingly connected to the second gear stages (7a, 7b) of the first and second electric machines (3a, 3b); and at least one power electronics unit (4a) defining a third central longitudinal axis (9c), wherein the first and second central longitudinal axes (9a, 9b) are axially parallel to each other on a circular path (10), the circular path (10) being defined in a plane perpendicular to an output axis (5), and wherein the third central longitudinal axis (9c) is on the circular path (10).

2. The transmission arrangement (16) of claim 1, wherein the first central longitudinal axis (9a) is coaxial to a first rotor shaft (11a) of the first electric machine (3a), and wherein the second longitudinal axis (9b) is coaxial to a second rotor shaft (11b) of the second electric machine (3b).

3. The transmission arrangement (16) of claim 1, wherein the third central longitudinal axis (9c) is perpendicular to the circular path (10).

4. The transmission arrangement (16) of claim 1, wherein each of the first gear stages (6a, 6b) of the first and second electric machines (3a, 3b) is a planetary transmission having at least one planetary gear set.

5. The transmission arrangement (16) of claim 1, further comprising at least one clutch unit (15), each of the at least one clutch unit (15) configured for selectively decoupling a respective one of the first and second electric machines (3a, 3b) from the differential (8).

6. The transmission arrangement (16) of claim 5, wherein each of the at least one clutch unit (15) is arranged in power flow between a respective pair of the first and the second gear stages (6a, 6b, 7a, 7b).

7. The transmission arrangement (16) of claim 1, wherein one or more of the first gear stage (6a) of the first electric machine (3a) and the first gear stage (6b) of the second electric machine (3b) is a multi-stage unit configured for shifting between at least two gear stages.

8. The transmission arrangement (16) of claim 1, wherein one or more of the second gear stage (7a) of the first electric machine (3a) and the second gear stage (7b) of the second electric machine (3b) is a multi-stage unit configured for shifting between at least two gear stages.

9. The transmission arrangement (16) of claim 1, further comprising an oil sump (14) vertically below the first and second electric machines (3a, 3b).

10. The transmission arrangement (16) of claim 1, wherein the first and second central longitudinal axes (9a, 9b) are perpendicular to the circular path (10).

11. A drive device for an at least partially electrically driven vehicle (1), comprising the transmission arrangement (16) of claim 1.

12. An at least partially electrically driven vehicle (1), comprising the drive device of claim 11.

13. An at least partially electrically driven vehicle (1), comprising the transmission arrangement (16) of claim 1.

14. The transmission arrangement (16) of claim 1, wherein the circular path (10) is centered on the output axis (5).

15. The transmission arrangement (16) of claim 1, wherein the third central longitudinal axis is vertically below the first and second central longitudinal axes (9a, 9b).

16. The transmission arrangement (16) of claim 1, wherein the output axis (5) is an output rotational axis of the differential (8).

* * * * *